Dec. 25, 1928.

1,696,888

F. D. SCHULTZ

PORTABLE BURNING APPARATUS

Filed June 26, 1926     2 Sheets-Sheet 1

WITNESSES

Inventor
FRANK D. SCHULTZ

By Richard B. Owen
Attorney

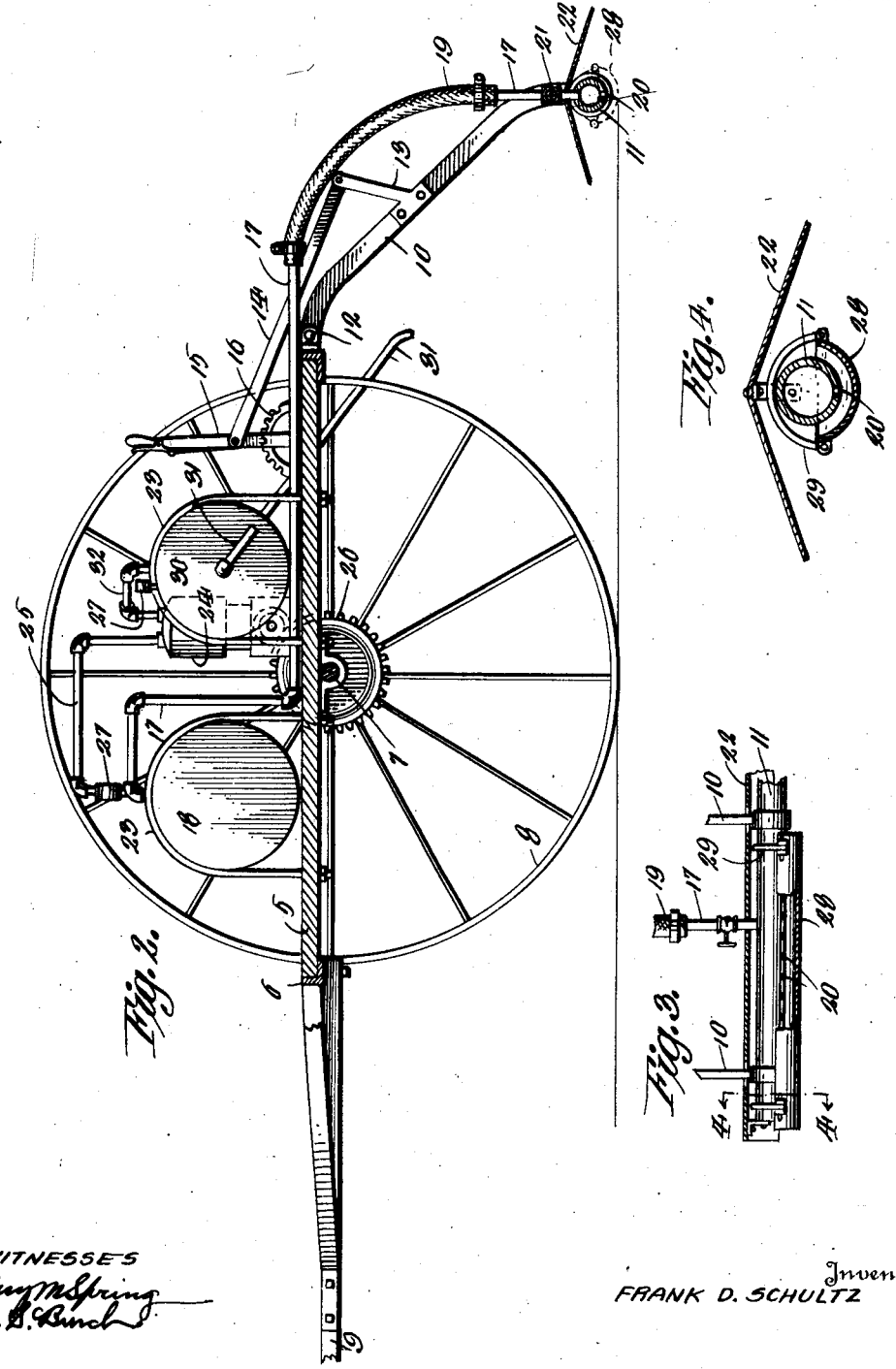

Patented Dec. 25, 1928.

1,696,888

UNITED STATES PATENT OFFICE.

FRANK D. SCHULTZ, OF SEATTLE, WASHINGTON, ASSIGNOR OF ONE-HALF TO ALBERT THERRY, OF SEATTLE, WASHINGTON.

PORTABLE BURNING APPARATUS.

Application filed June 26, 1926. Serial No. 118,766.

This invention relates to certain new and useful improvements in portable burning apparatus, and has more particular reference to an apparatus of this kind particularly serviceable for destroying and burning or consuming weeds, trash, insects and the like upon a field preparatory to plowing the same for planting purposes.

The primary object of the pesent invention is to provide an apparatus of the above kind which is extremely simple and durable in construction as well as efficient in operation.

A further object is to provide an apparatus of the above kind having efficient means for producing an extremely hot flame in proximity to and against the ground over which the apparatus is drawn so that expeditious and effective destruction and consumption of weeds, trash and insects is insured.

A further object is to provide an apparatus of this class which may be put into practical use with a minimum amount of attention, and which embodies burners and fuel supplying means for the burners mounted upon a wheeled supporting frame, whereby the burners may be readily manually adjusted to the desired distance from the surface or elevated sufficiently to clear obstructions encountered when the apparatus is in use.

A further object is to provide an apparatus of this class with means for preventing spreading of the flames from the burning weeds and the like, whereby the burning of the weeds, trash and the like may be restricted to the path of travel of the vehicle and the danger of the flames spreading beyond control, avoided.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a view, partly in top plan, and partly broken away, of a portable burning apparatus constructed in accordance with the present invention;

Figure 2 is a view thereof, partly in side elevation, and partly in longitudinal section;

Figure 3 is a fragmentary detail view, partly in rear elevation, and partly broken away and in section, of the burner and associated parts of the apparatus shown in Figures 1 and 2; and Figure 4 is an enlarged transverse section taken substantially upon line 4—4 of Figure 3.

Figure 1:
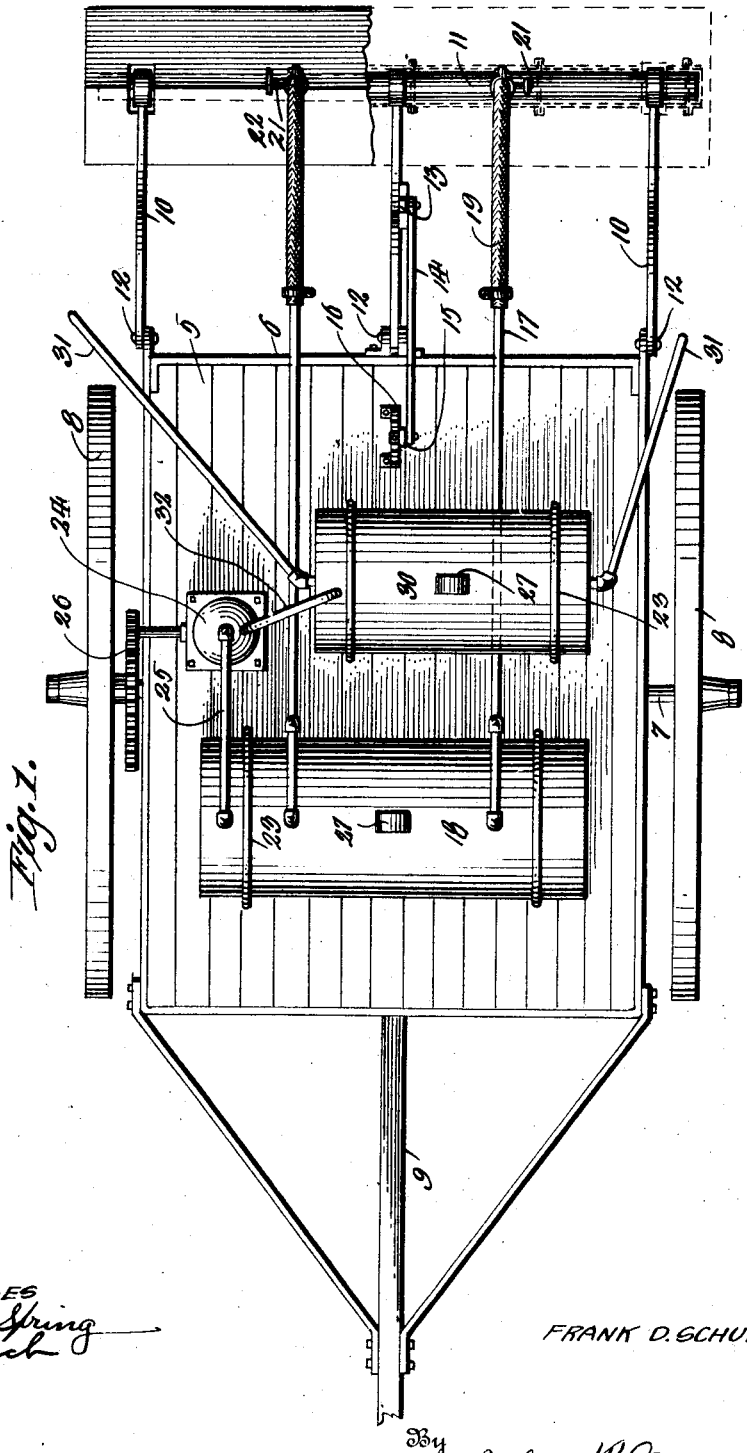

Referring more in detail to the drawings, the form of the invention shown embodies a suitable horizontal platform 5 rigidly carried in a rectangular frame 6 which is mounted upon a transverse axle 7 having supporting wheels 8 journaled upon the ends thereof, the frame 6 being provided at its forward end with a forwardly projecting draft tongue 9 for facilitating drawing of the apparatus over the field by draft animals, or the like.

Suspended from the rear end of the frame 6 by means of hanger bars 10 is an elongated tubular burner head 11 which is disposed transversely of the wheeled supporting frame and horizontally positioned in proximity to the ground when in use, and in order that the burner head may be adjusted vertically to vary the distance between the same and the ground or to clear obstructions encountered, the hanger bars 10 are pivoted at their upper ends to the rear corners of the frame 6 as at 12 for vertical swinging movement, and manually operable means is provided for vertically swinging the hanger bars 10 and retaining the same in any desired position of vertical swinging adjustment. This manually operable means may consist of an upwardly projecting arm 13 rigid with one of the hanger bars 10 and connected by means of a link 14 with a hand lever 15 which is pivoted upon the rear end of the platform 5 for forward and rearward swinging movement and provided with a suitable manually releasable catch adapted to cooperate with a rack segment 16 rigidly mounted upon the platform. The burner head 11 is provided with a plurality of rigid supply pipes 17 leading from a suitable liquid fuel reservoir or tank 18 rigidly mounted upon the forward end portion of the platform 5, and these supply pipes have flexible sections 19 interposed in the rear end portions thereof so as to permit the vertical movement or adjustment of the burner head. The burner head is provided with a longitudinal series of fuel outlet openings 20 in the underside thereof as clearly shown in Figures 2 to 4 so that the flames produced will be directed downwardly onto the ground, and a suitable controlling and shut off valve 21 is provided in each of the supply pipes 17 for regulation of the flame from the burner head. A suitable arched or V-shaped baffle 22 is suitably rigidly mounted above and adjacent to the burner head 11 so as to confine the heat of the flames from the burner head adjacent the ground, and this baffle is preferably constructed of a suitably bent sheet of metal extending from end to end of the burner head.

The fuel supply tank 18 is preferably of cylindrical form and horizontally disposed to extend transversely of the platform 5, and this tank is preferably secured in position by means of U-shaped strap irons 23 embracing the ends of the tank and passing through the platform 5 with nuts threaded upon the ends thereof beneath the platform.

Suitable means is provided for introducing fuel into the tank 18 under pressure so that the same will be forcibly supplied from the tank 18 to the burner head 11 whereby a very hot flame is insured for effective destruction of weeds, trash and insects. For this purpose, an air pump 24 is preferably mounted upon the platform rearwardly of the tank 18 and adjacent one of the supporting wheels 8, the outlet of the pump being placed in communication with the tank 18 by means of a pipe 25, and the drive shaft of the pump being operatively connected with the adjacent supporting wheel 8 by means of gearing 26. It will be seen that, with this construction, air under pressure will be automatically supplied to the fuel tank upon forward travel of the apparatus, and if necessary, any suitable means may be provided for rendering the pump 24 periodically inoperative, or a suitable relief valve may be provided for permitting the automatic escape of air under excessive pressure. These details are conventional in nature and form no part of the present invention, and they are therefore not shown. A suitable pressure gage 27 may be provided on the tank 18 to indicate the air pressure therein.

In order to facilitate propagation of flame at the burner, a pan 28 is suspended beneath each half of the burner head 11 so that the latter is partially submerged therein as shown in Figure 4, the pans being of a combined length to extend substantially from end to end of the burner head and having suitable means such as hangers 29 for removably suspending the same from the burner. With this construction, the pan 28 may be operatively positioned as shown in Figures 3 and 4 and as indicated in Figure 2 by dotted lines, whereupon the valves 21 may be opened to permit the fuel to flow into the pan 28. When the fuel in the pan 28 is subsequently lighted, the burner head 11 will be heated, during which operation the valves 21 will be closed. The valves 21 are then opened or partially opened, and then the fuel passing out of the outlet openings 20 is lighted, such fuel being readily ignited by reason of the pre-heating of the burner head. In this way propagation of flame is facilitated in cold weather or when using heavier grades of liquid fuel. When the burner head is lighted, the apparatus is drawn over the field and the burner head 11 is adjusted to the required position in proximity to the ground by swinging the hand lever 15 rearwardly. Should any obstructions be encountered, the burner may be readily lifted to pass over the same by swinging the lever 15 forwardly.

The present invention also contemplates the provision of means for preventing the fire produced by burning the weeds, trash and so forth, from spreading laterally so that the burning operation is confined to the path of travel of the apparatus. This means preferably consists of a water tank or reservoir 30 upon the platform 5 rearwardly of the tank 18 said water tank having a pair of outlet pipes 31 leading rearwardly and downwardly to opposite sides of the frame 6 in advance of the burner head 11, the outlet of the pump 24 being placed in communication with the tank 30 by means of a pipe 32 whereby the water is forcibly fed from the tank and through the outlet pipes 31 to issue in jets projected upon the ground in advance of the ends of the burner head. The tank 30 is preferably similar in form to the tank 18 and secured upon the platform in the same manner as described above in connection with the tank 18, the tank 30 being provided with a pressure gage 27 for an obvious purpose. It will be seen that the water is sprayed upon the ground in advance of the ends of the burner head during forward travel of the apparatus so that the ground and trash and weeds thereon are wetted so that spreading of the flames is prevented.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

A portable burning apparatus of the class described comprising a wheeled supporting body, a fuel tank supported thereon, arms pivotally connected with the rear corners of the body, an arm pivotally connected with the rear portion of the body between the rear corners thereof, a tubular burner head supported by the lower ends of the arms, pipes leading from the fuel supply tank to the rear end of the body, flexible hose connections between the pipes and the burner head, a lever mounted upon the body, and an operative connection between the said lever and the intermediate arm for effecting vertical adjustment of the burner head.

In testimony whereof I affix my signature.

FRANK D. SCHULTZ.